United States Patent [19]

Nishi

[11] Patent Number: 5,343,253

[45] Date of Patent: Aug. 30, 1994

[54] GHOST REMOVAL APPARATUS FOR TELEVISION RECEIVER USING CHANGED AND ADAPTIVE GHOST DETECTION COEFFICIENTS

[75] Inventor: Yuji Nishi, Iwai, Japan

[73] Assignee: Victor Company of Japan, Ltd., Yokohama, Japan

[21] Appl. No.: 982,714

[22] Filed: Nov. 27, 1992

[30] Foreign Application Priority Data

Nov. 28, 1991 [JP] Japan .................. 3-339965

[51] Int. Cl.⁵ .............................................. H04N 5/21
[52] U.S. Cl. .................................................. 348/614
[58] Field of Search ................ 358/905, 166, 167, 36, 358/37; 348/614; H04N 5/21, 5/212

[56] References Cited

U.S. PATENT DOCUMENTS

| | | | |
|---|---|---|---|
| 5,025,317 | 6/1991 | Koguchi et al. | 358/167 |
| 5,089,892 | 2/1992 | Koguchi et al. | 358/167 |
| 5,144,414 | 9/1992 | Nishi et al. | 358/36 |
| 5,216,507 | 6/1993 | Ito et al. | 358/166 |

*Primary Examiner*—Victor R. Kostak
*Assistant Examiner*—Nathan S. Flynn
*Attorney, Agent, or Firm*—Jacobson, Price, Holman & Stern

[57] ABSTRACT

A ghosts removal apparatus for removing a waveform distortion and ghost in television receivers and other various types of image apparatus, can exclude the influence of random noise when ghost is removed, and can favorably remove minute ghost components. A multiplication ratio setting circuit has a second judgment circuit in which a number of ghost removal is counted, and a read only memory (ROM) table which outputs a gradually smaller value of a ghost detection coefficient along with the counted number larger. At the start of ghost removal processing, a large value of the ghost detection coefficient is outputted to exclude the influence of the random noise, and along with the progress of ghost removal processing, a smaller value of the ghost detection coefficient is outputted so that minute residual ghost components can be accurately detected. Accordingly, it is possible for the tap gain of the transversal filter to be set to an optimum value and for ghost to be favorably removed.

12 Claims, 4 Drawing Sheets

GHOST REMOVAL APPARATUS FOR TELEVISION RECEIVER USING CHANGED AND ADAPTIVE GHOST DETECTION COEFFICIENTS

BACKGROUND OF THE INVENTION

The present invention relates to ghost removal apparatus which remove waveform distortion or ghost and which are used in television receivers and other various types of image apparatus which handle television signals. In particular, the present invention has as an object the provision of a ghost removal apparatus which can exclude the influence of random noise when there is ghost removal, and which can favorably remove minute ghost components.

In recent years, with the shift to high-definition television broadcasting, television image signals have been inserted into a reference signal (GCR signal) for ghost cancellation in an attempt to improve the image quality of television broadcasts. On the side of the receiver, the reference signals for ghost cancellation are extracted and those signals are used as the basis for ghost removal. These GCR signals are disclosed in detail in Japanese Patent Application No. 1-69179/1989 (Laid-Open No. 2-290398/1990) and U.S. patent application Ser. No. 07/783,826, and hence the details of this will be omitted here.

FIG. 1 shows a conventional example of a known ghost removal apparatus which has a construction and operation on the basis of the principle described above.

A conventional ghost removal apparatus 1 comprises, as shown in FIG. 1, an analog/digital (A/D) conversion circuit 2 which converts inputted analog image signals $S_{IN}$ into digital signals, a transversal filter 3 which removes a ghost component from the converted digital signals by performing a calculated weighting for a cancellation of ghost, a digital/analog (D/A) conversion circuit 4 which converts the output of the transversal filter 3 into analog signals again to output the analog signals as image signals $S_{OUT}$, a timing generator circuit 5 which generates various signals such as vertical sync signals, horizontal sync signals and waveform extraction pulses from the inputted image signals $S_{IN}$, a waveform extraction circuit 6 which extracts a signal component of a required constant cycle (such as a single scan line portion) including the GCR signals from the output transversal filter 3, and a calculation processing circuit 7 which detects and determines as to whether or not a tap gain of the transversal filter 3 should be changed on the basis of the outputs of the timing generator circuit 5 and the waveform extraction circuit 6, and which calculates the tap gain when it should be changed.

Even though there is eliminated a description by using the figures, the calculation processing circuit 7 comprises a waveform check circuit for checking a waveform and timing of the waveform extraction circuit 6, a sync addition circuit for converting an output of the waveform extraction circuit 6 into a reference waveform, an ideal reference waveform creation circuit for generating an ideal reference waveform, a waveform comparison circuit for comparing both of the outputs from the sync addition circuit and the ideal reference waveform creation circuit, an estimation function calculating circuit for calculating an estimation function on the basis of an output of the waveform comparison circuit, a minimum value storage circuit for storing a minimum value of the estimation function, a comparison processing circuit for comparing the estimation function which is calculated by the estimation function calculation circuit and the minimum value of the estimation function which is stored in the minimum value storage circuit and for determining as to whether or not a present estimation function which is a condition for renewal of a tap gain coefficient, is less than a minimum value of the past estimation function, a cumulative addition circuit for performing a cumulative addition averaging of error signal trains on the basis of an output of the waveform comparison circuit, a multiplication ratio setting circuit for determining a multiplication ratio for renewal of the tap gain coefficient on the basis of both of the outputs of the comparison processing circuit and the cumulative addition circuit, and a tap gain setting circuit for determining the tap gain coefficient of the transversal filter 3 on the basis of the multiplication ratio determined by the multiplication ratio setting circuit.

The conventional ghost removal apparatus described above, has two important comparison and determination operations in order to renew the tap gain coefficient of the transversal filter 3. Namely, one is a comparison and determination operation for successively renewing the estimation function by means of the comparison processing circuit, and the other is a comparison and determination operation for comparing the cumulative addition average with the ghost detection coefficient by means of the multiplication ratio setting circuit. In the latter case, when the cumulative addition average is larger than the ghost detection coefficient which has been set to a constant value, it is judged that a ghost component is contained in the image signals.

Accordingly, there is the following first problem when the influence of the ghost detection coefficient is set to a larger value in order to avoid the influence of the random noise component. Namely, it is difficult for the ghost removal apparatus to detect a residual ghost component such as a minute ghost component so that the removal of residual ghost becomes more difficult because the cumulative addition average, that is, the residual ghost component becomes smaller with the advance of ghost removal processing.

On the other hand, there is the following second problem when the ghost detection coefficient is set smaller so as to facilitate detection of the residual ghost component. Namely, at the start of ghost removal processing, when there is a low S/N (signal to noise) ratio, the random noise component included in the cumulative addition average is erroneously detected by the ghost removal apparatus as a ghost component, and an unnecessary tap gain is set with respect to the transversal filter 3, and there is a wrong phenomenon such as erroneous operation or a divergence.

SUMMARY OF THE INVENTION

A primary object of the present invention is to provide a ghost removal apparatus configured with a means which excludes the influence of random noise when there is ghost removal, and which can favorably remove minute ghost components.

In addition, another object of the present invention is to provide a ghost removal apparatus which removes ghost through the use of GCR signals for ghost cancellation and which have been inserted in the image signals.

In order to attain the objectives described above, the ghost removal apparatus relating to the present invention is comprised of an A/D conversion circuit which converts incoming image signals into digital data, a transversal filter which performs weighting to cancel calculated ghost and so remove ghost from image signals which have been converted into digital data by the A/D conversion circuit and then outputs them, a D/A conversion circuit which converts into analog data the digital data from which ghost has been removed and which have been output from the transversal filter, a waveform extraction circuit which extracts a required certain period which includes the GCR signals from the output of the transversal filter and then stores it, and a calculation processing circuit provided with a multiplication ratio setting circuit which outputs a multiplication ratio setting signal from the cumulative addition average of the cumulative addition of error signal trains obtained by performing calculation of an output of said waveform extraction circuit and for between sync added and waveform converted signals, and an ideal reference waveform signal, and a tap gain setting circuit which performs calculation processing for a coefficient with respect to the transversal filter, from the error signal strings and the multiplication ratio setting signals and rewrites the coefficient to the transversal filter, and wherein:

the multiplication ratio setting circuit comprises means for detecting a time at a start of ghost removal processing and when a signal noise ratio (S/N) is low for which an erroneous detection of a random noise component occurs easily; ghost detection coefficient setting means for setting a ghost detection coefficient to a high value to prevent an erroneous detection of a random noise component when the start of ghost removal processing and a low S/N are detected, and for setting the ghost detection coefficient to gradually lower values along with the progress of ghost removal processing; and multiplication ratio setting means for outputting a tap gain multiplication ratio to the tap gain setting circuit on the basis of a ghost coefficient which has been variably set by the setting means.

As being more concrete configuration, the ghost removal apparatus according to the present invention is comprised of a multiplication ratio output circuit which outputs the multiplication ratio setting signals, a counter which counts a number of times of ghost removal processing and outputs control signals, a ghost detection coefficient output circuit which in accordance with the control signals outputs a ghost detection coefficient of a smaller value along with an increase in the number of times of ghost removal processing, a comparison circuit which compares the cumulative addition average and the ghost detection coefficient and detects whether or not there is a residual ghost component, and a gate circuit which outputs the multiplication ratio setting signal supplied from the multiplication ratio detection circuit to the tap gain setting circuit only when the cumulative addition average is larger than the ghost detection coefficient.

As described above, the ghost removal apparatus of the present invention, selectively switches the ghost removal coefficient in accordance with the progress of ghost removal processing so that ghost is removed without receiving the influence of random noise when there is the start of ghost removal processing, and enables even minute ghost components to be favorably removed as ghost removal processing proceeds. It is therefore possible to have excellent ghost removal processing which has not until now been available.

BRIEF DESCRIPTION OF THE DRAWINGS

In the appended drawings.

DETAILED DESCRIPTION OF THE PREFERRED EMBODIMENTS

The present invention solves the problem described above by selectively changing the ghost detection coefficient which was conventionally a constant value, in accordance with the ghost removal processing.

At the commencement of ghost removal processing, and when there is a low S/N ratio, the random noise which is included in the cumulative addition average can be thought of as not being lowered by a cumulative addition circuit and so the ghost detection coefficient is set so there is not the erroneous detection of the random noise component as a ghost component. When ghost removal processing proceeds, the random noise component which is included in the cumulative addition average lessens, and only the original ghost component remains in the cumulative addition average and so the ghost detection coefficient is set to a gradually smaller value. By this, it is possible for the ghost removal apparatus of the present invention to smoothly perform ghost removal processing.

Next, there will be described a ghost removal apparatus according to an embodiment of the present invention with reference to FIGS. 2-4.

Figure 1:
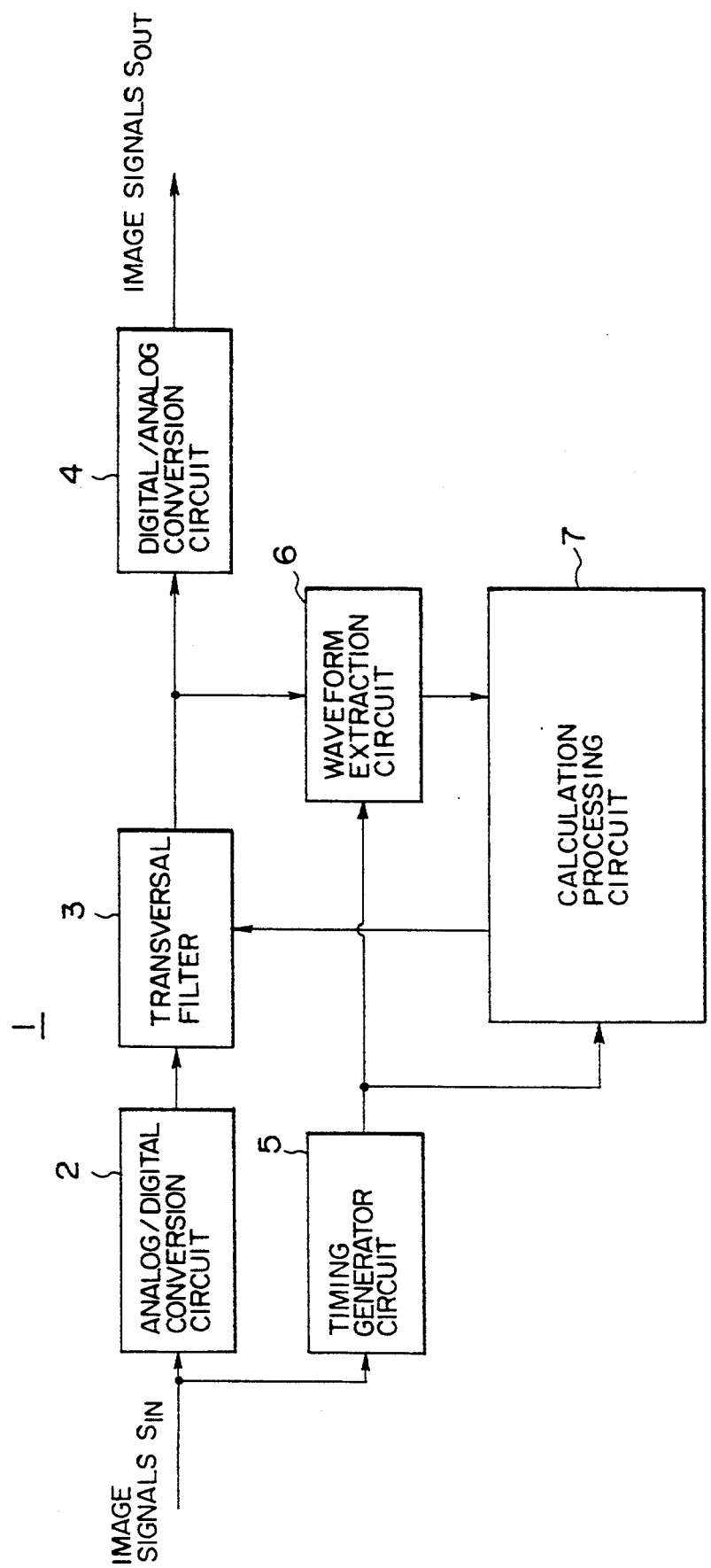
FIG. 1 is a block diagram showing the configuration of a conventional ghost removal apparatus.
Figure 2:
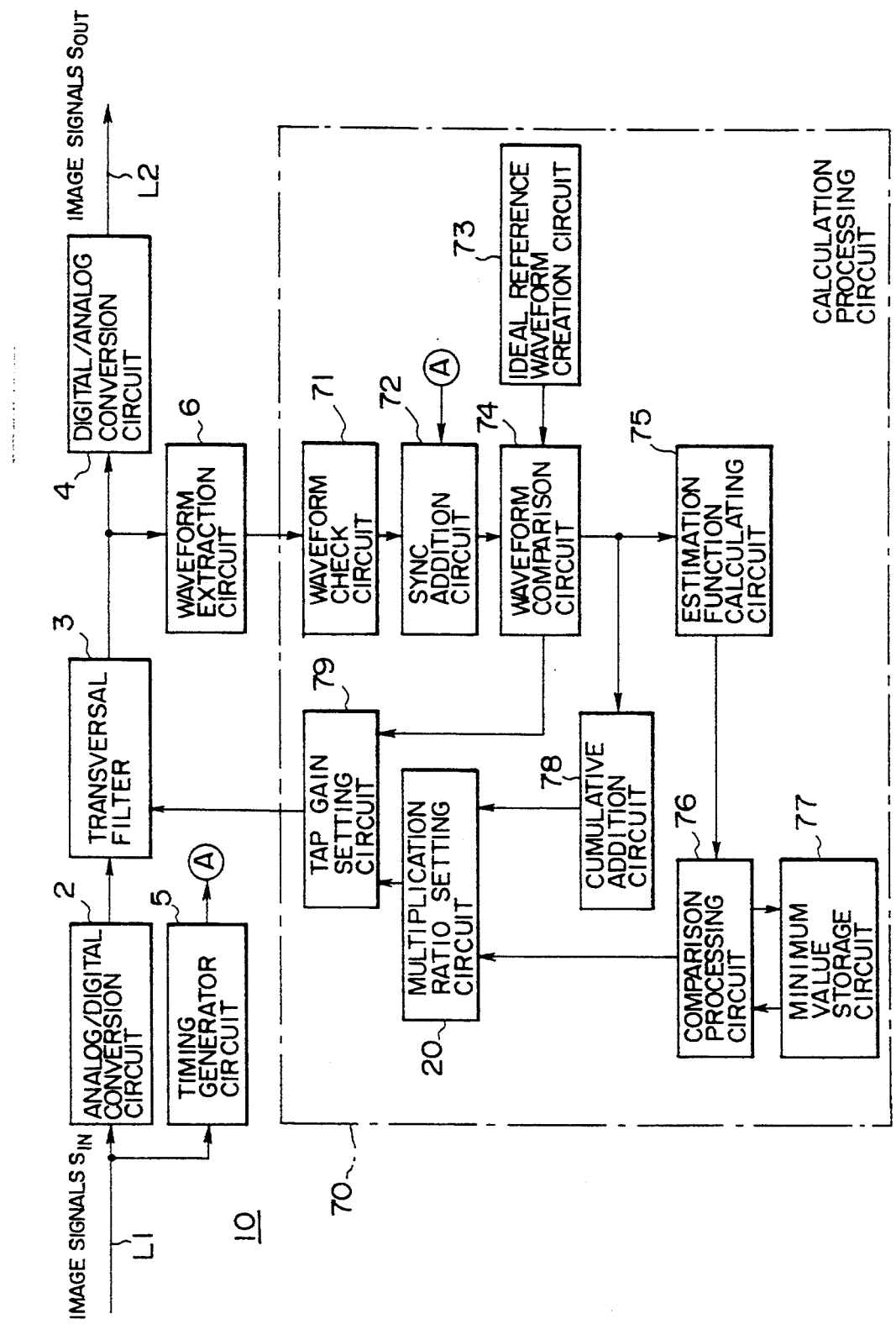
FIG. 2 is a block diagram of a ghost removal apparatus according to an embodiment of the present invention.

FIG. 2 shows a block diagram of an entire configuration of the ghost removal apparatus of the embodiment of this invention. Since a ghost removal apparatus 10 of this embodiment has the basically same configuration as the conventional apparatus shown in FIG. 1, numerals 2-6 are the same components as FIG. 1.

Analog image signals inputted from the input signal line of L1 are sampled at a sampling frequency of 4 fsc by an analog/digital (A/D) conversion circuit 2 (where an fsc is a chrominance subcarrier wave frequency, fsc=3.58 MHz), and are converted into digital signals. After this, they pass through the transversal filter 3 and only a required constant cycle (such as a single scan line portion) which includes the GCR signals is extracted by a waveform extraction circuit 6. At a timing generator circuit 5, signals such as the vertical sync signals, horizontal sync signals and the waveform extraction pulse and the like are generated from the input image signals.

An output of the waveform extraction circuit 6 is sent to a waveform check circuit 71 inside a calculation processing circuit 1a and a check is performed for the waveform and the timing. When the waveform check circuit 71 judges correctness, a sync addition circuit 72 converts the output of the waveform check circuit 71 into a shape in agreement with the reference waveform, and performs sync addition using a certain timing as the reference. The sync addition circuit 72 improves the S/N ratio by sync addition. A waveform comparison circuit 74 compares the output of the sync addition circuit 72 with an ideal reference signal waveform for ghost removal and which has been calculated beforehand in an ideal reference waveform creation circuit 73, and becomes an error signal train.

This error signal string is then used as the basis for successively determining values of an estimation function in an estimation function calculating circuit 75. The followings are examples of the estimation function:

$$E = \int_{t2}^{t1} \epsilon^2(t)dt$$

$$E = \int_{t2}^{t1} |\epsilon(t)|dt$$

Where,
s(t): extracted waveform
d(t): ideal reference waveform
$\epsilon(t)=s(t)-d(t)$: error signal The currently determined estimation function and a minimum value (where this minimum value is stored in a minimum value storage circuit 77) of the estimation function determined for up till that time are compared in the comparison processing circuit 76. When the currently determined estimation function is smaller as the result of comparison, the minimum value of the estimation function stored in the minimum value storage circuit 77 is renewed. There is also a judgment performed for whether the current estimation function is less than a constant (>1.0) multiple of the minimum value of a past estimation function, and which is one of the conditions for renewal of the tap gain (coefficient) of the transversal filter 3. The comparison processing circuit 76 sends the judgment results to a multiplication ratio setting circuit 20 when it is judged that the above condition has been satisfied.

In a cumulative addition circuit 78, cumulative addition for the error signals trains outputted from the waveform comparison circuit 74 is performed. The error signal trains can be thought of as including a random noise component and a residual ghost component and so cumulative addition averaging is performed with the object of excluding the random noise component.

The multiplication ratio setting circuit 20 of the following stage refers to the judgment results for the evaluation function in the A/D conversion circuit 2 and the results of the cumulative addition averaging from the cumulative addition circuit 78 and determines the multiplication ratio for the renewal of the tap gain of the transversal filter 3. The two conditions which this setting of the multiplication ratio must satisfy are that the estimation function be less than a constant (>1.0) multiple which is a past minimum value (as judged by the comparison processing circuit 76 as described above), and that the cumulative addition averaging be larger than a ghost detection coefficient which is selectively changed as the ghost removal processing advances. When both of these conditions are not satisfied, the multiplication ratio setting circuit 20 sets the multiplication ratio to zero, and there is no renewal of the tap gain.

Since the multiplication ratio setting circuit 20 is the most characteristic portion of this invention, a detailed description of this circuit will be described later by using FIG. 3.

The tap gain setting circuit 79 sets the tap gain optimum for ghost removal, from the error signal strings which are supplied from the waveform comparison circuit 74 and the multiplication ratio setting output which is supplied from the multiplication ratio setting circuit 20, and renews the tap gain of the transversal filter 3. The transversal filter 3 removes the ghost in the input signals by this tap gain which has been set. The image signals which pass the transversal filter 3 undergo D/A conversion by the D/A conversion circuit 4 and image signals $S_{OUT}$ are outputted by the line L2.

The ghost removal apparatus shown in FIG. 2 repeatedly performs these operations described above and the ghost is removed by the successive renewal of the tap gain of the transversal filter 3 in accordance with the ghost condition for the input signals.

Figure 3:
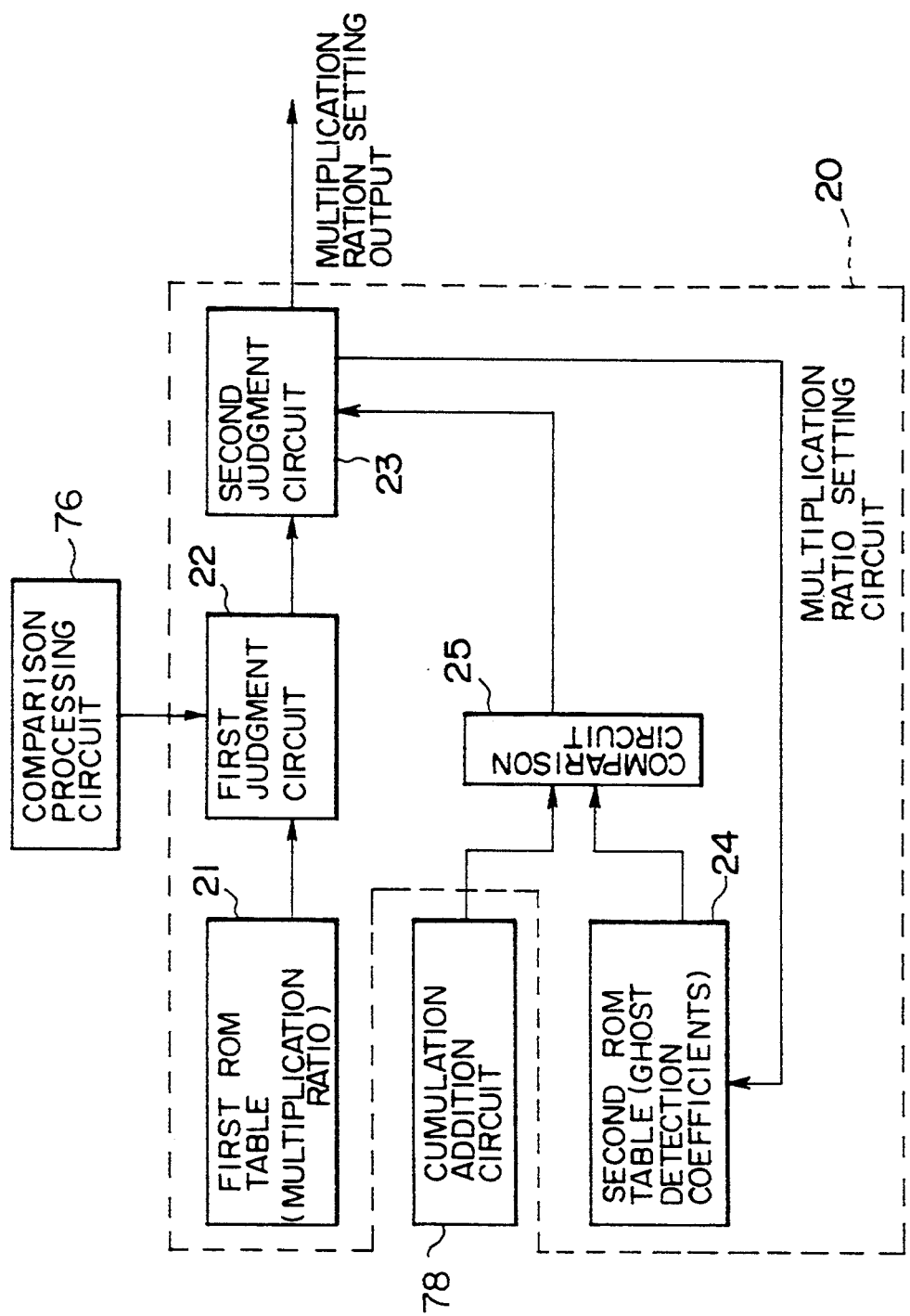
FIG. 3 is a block diagram of a multiplication ratio setting circuit which is an important portion of the ghost removal apparatus according to the embodiment shown in FIG. 2 of the present invention.
Figure 4:
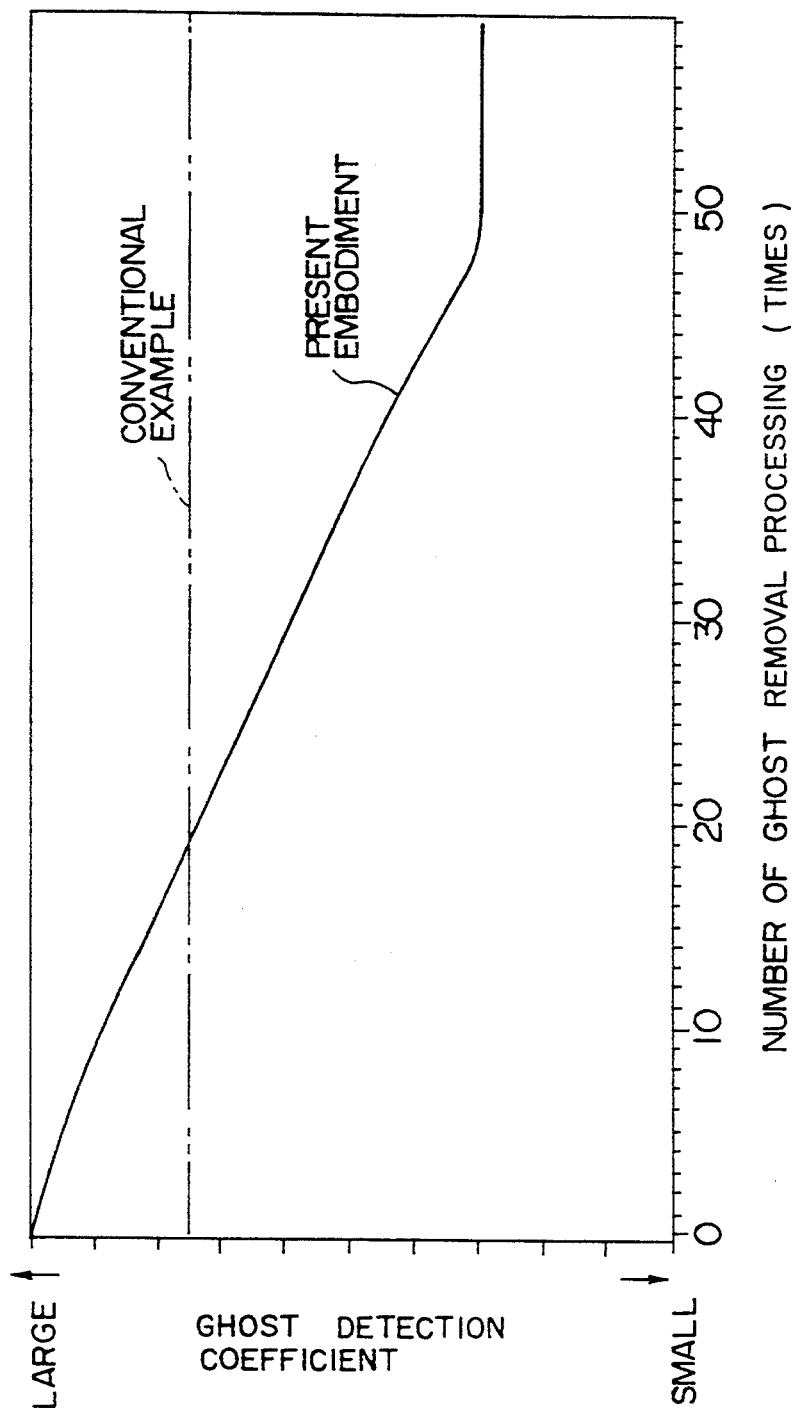
FIG. 4 is a graph showing an example of the setting of the ghost detection coefficient in an embodiment of the present invention.

FIG. 3 shows an embodiment of the multiplication ratio setting circuit which is an important part of the ghost removal apparatus of the present invention. Moreover, other than the internal configuration of this multiplication ratio setting circuit, the ghost removal apparatus is the same as a conventional example and so descriptions of those portions and figures showing their configuration will be omitted.

The following is a description of the multiplication ratio setting circuit 20 shown in FIG. 3. The tap gain calculation multiplication ratio stored in a ROM (Read Only Memory) table 21 (multiplication ratio output circuit) is supplied to a first judgment circuit 22. The results of judgment for whether or not the current evaluation function is less than a constant (>1.0) multiple which is the minimum value for a past evaluation function, and which is one of the conditions for renewal of the tap gain (coefficient) of the transversal filter 3, is also supplied to the first judgment circuit 22. When the judgment result is that the condition for tape gain renewal is satisfied, the first judgment circuit 22 outputs the supplied tap gain calculation multiplication ratio to a second judgment circuit 23 of the next stage. The second judgment circuit 22 is a gate circuit which determines whether or not to output the tap gain calculation multiplication ratio supplied from the first judgment circuit 22, to the tap gain setting circuit 79 of the next stage (refer to FIG. 2).

The following is a description of a operation of the comparison circuit 25 and the gate condition of the second judgment circuit 23. The comparison circuit 25 is supplied with the ghost detection coefficient from a ROM table 24 (ghost detection coefficient output circuit), when the cumulative addition average is supplied from the cumulative addition circuit 78. Then, the comparison circuit 25 performs a comparison of the ghost detection coefficient and the cumulative addition average and outputs the results of that comparison to the second judgment circuit 23. The second judgment circuit 23 opens the gate when the result of comparison is that the cumulative addition average is larger than the ghost detection coefficient, and outputs the tap gain calculation multiplication ratio as the multiplication ratio setting output (and in this case, the tap gain of the transversal filter 3 is renewed), and closes the gate for other results of comparison (and in these cases, the tap gain of the transversal filter 3 is not renewed). Moreover, the second judgment circuit 23 is provided with a counter which counts the number of judgments for the opening and closing of the gate and which is the number of times of ghost removal processing.

In this manner, when the condition that the current evaluation function be less than a constant (>0) multiple of the minimum value for the past evaluation function (and which is judged by the comparison processing circuit 76), and the condition that the cumulative addition average be larger than the ghost detection coefficient (and which is judged by the comparison circuit 25) are both satisfied at the same time, the tap gain calculation multiplication ratio is output from the multiplication ratio setting circuit 20 and the tap gain (coefficient) of the transversal filter 3 is renewed, At the commencement of ghost removal processing, as described above, the S/N ratio can be thought of as not being favorable, and the ghost component can be thought of as large. Accordingly, ghost removal will not be correctly performed if a ghost detection coefficient set to a large value is not used and so a ghost detection coefficient which has been set to a large value is read from the ROM table 24 and when there is the progress of ghost removal processing, the number of times is counted by the counter of the second judgment circuit 23 as described above. In addition, when there is further progress of ghost removal and the random noise component is reduced, the S/N ratio of the cumulative addition average improves and the component which is included in the cumulative addition average is practically all minute ghost component. Accordingly, with a ghost detection coefficient which was initially set to a large value, the comparison circuit 25 will not be able to correctly judge whether or not there is a ghost component remaining. Therefore, the control signals are sent from the second judgment circuit 23 to the ROM table 24 in accordance with the number of the count of the counter and as the number of the count increases (and the number of times of ghost removal processing increases), the ROM table 24 outputs ghost detection coefficients which are progressively smaller. This control of the ghost detection coefficients enables the multiplication ratio setting circuit 20 to accurately detect minute ghost components and so the ghost removal apparatus of the present invention can favorably perform the removal of minute residual ghost components. FIG. 4 shows an example for the settings of the ghost detection coefficients.

Moreover, the counter counts the number of times of ghost removal processing and so need not necessarily be provided in the second judgment circuit 23, and can be provided at a position where the number of times of comparison of the comparison circuit 25 is counted, or where the number of times of judgment by the first judgment circuit 22 is counted.

What is claimed is:

1. A ghost cancelling apparatus for removing ghost by using ghost cancellation reference (GCR) signals inserted into image signals, comprising:

an analog/digital conversion circuit for converting analog image signals into digital data;

a transversal filter for performing weighted calculation in accordance with a tap gain coefficient to erase ghost and thereby remove ghost from image signals which have been converted into digital data by said analog/digital conversion circuit;

a digital/analog conversion circuit for converting into analog data the digital data which has had ghost removed and which is output from said transversal filter;

a waveform extraction circuit for extracting and holding a predetermined period of said digital data which include GCR signals for ghost cancellation and which have been output from said transversal filter;

a calculation processing circuit comprising:

means for judging the predetermined period of digital data extracted by said waveform extraction circuit and generating an output indicating the digital data is acceptable; means for transforming the predetermined period of digital data and adding a sync thereto and generating a transformed output; and means for comparing an ideal reference waveform with the output of the transformed output to generate a cumulative addition average of error signal trains;

a multiplication ratio setting circuit which comprises detection means, ghost detection coefficient setting means and multiplication ratio setting means for outputting a multiplication ratio setting signal from the cumulative addition average of the error signal trains, and a tap gain setting circuit which performs calculation processing for said error signal trains and said multiplication ratio setting signal and outputs a tap gain coefficient supplied to said transversal filter;

said detection means detecting a time at a start of ghost removal processing and when a signal/noise ratio (S/N) is below a predetermined level and for which an erroneous detection of a random noise component occurs;

said ghost detection coefficient setting means setting a ghost detection coefficient to a value to prevent erroneous detection of the random noise component when the start of ghost removal processing and a below a predetermined level are detected, and setting the ghost detection coefficient to gradually lower values concurrent with the progress of ghost removal processing; and said multiplication ratio setting means outputting a tap gain multiplication ratio to said tap gain setting circuit on the basis of a ghost coefficient which has been variably set by said ghost detection coefficient setting means.

2. The apparatus of claim 1, wherein:

said ghost detection coefficient setting means comprises a ghost detection coefficient output circuit for setting and outputting said ghost detection coefficient set to a value which gradually decreases as processing proceeds after the start of ghost removal processing, and a comparison circuit for comparing said error signal trains which are a cumulative addition average and ghost detection coefficients which have been output from said ghost detection coefficient output circuit; and said multiplication ratio setting means comprises a multiplication ratio output circuit which sets beforehand and outputs a multiplication ratio for the calculation of a tap gain coefficient, a first judgment circuit for outputting a calculated multiplication ratio which is output from said multiplication ratio output circuit when it is judged that tap gain renewal conditions have been satisfied, and a second judgment circuit serving as a gate circuit for outputting to said tap gain setting circuit said calculated multiplication ratio for a tap gain coefficient and which has been supplied from said first judgment circuit in accordance with comparison results supplied from said comparison circuit of said ghost coefficient setting means.

3. The apparatus of claim 2, wherein said calculation processing circuit comprises:

a waveform check circuit for checking a timing and a waveform of image signals from digital data supplied from said waveform extraction circuits:

a sync addition circuit for converting output of said waveform check circuit into reference waveforms;

an ideal reference waveform creation circuit for generating an ideal reference wave;

a waveform comparison circuit for comparing said ideal reference wave output by the ideal reference waveform creation circuit with said reference waveforms converted by said sync addition circuit;

an estimation function calculation circuit for calculating an estimation function on the basis of an output of said waveform comparison circuit;

a minimum value storage circuit for storing a minimum value of said estimation function;

a comparison processing circuit which compares said minimum value stored in said minimum value storage circuit with said estimation function calculated by said estimation function calculation circuit, said comparison processing circuit judges whether or not a current estimation function is less than a multiple of a constant of said minimum value of a past estimation function and which is one condition for the renewal of a tap gain coefficient of said transversal filter, and outputs this judgment result to said multiplication ratio setting circuit;

cumulative addition circuit responsive to an output of said waveform comparison circuit for performing cumulative addition averaging of said error signal trains obtained by performing said calculation and outputting this calculation result to said multiplication ratio setting circuit;

said multiplication ratio setting circuit determining a multiplication ratio for the renewal of said tap gain coefficient on the basis of an output of said comparison processing circuit and said cumulative addition circuit; and said tap gain setting circuit determining said tap gain coefficient of said transversal filter on the basis of a multiplication ratio set by said multiplication ratio setting circuit 4. The apparatus of claim 2, wherein said multiplication ratio setting circuit calculation processing circuit comprises:

a multiplication ratio output circuit for outputting multiplication ratio setting signals;

a counter for outputting control signals after counting iterations of ghost removal processing;

a ghost detection coefficient output circuit which outputs ghost detection coefficient of smaller values in accordance with an increase of iterations of ghost removal processing and in accordance with said control signals;

a comparison circuit which compares said cumulative addition average with said ghost detection coefficient and detects whether or not a ghost component remains; and a gate circuit which outputs said multiplication ratio setting signals supplied from said multiplication ratio setting means to said tap gain setting circuit only when said cumulative addition average which is the result of comparison by said comparison circuit, is larger than said ghost detection coefficient.

5. The apparatus of claim 4, wherein:
said multiplication ratio output circuit comprises a first read-only memory (ROM) table which stores calculated multiplication ratios for the calculation of a tap gain coefficient for said transversal filter.

6. The apparatus of claim 4, wherein:
said ghost detection coefficient output circuit comprises a second ROM table which stores ghost detection coefficients which have been set so that their values become smaller as processing continues from the commencement of ghost removal processing.

7. The ghost removal apparatus of claim 2, wherein:
said first judgment circuit has a counter which counts iterations of ghost removal processing.

8. The apparatus of claim 7, wherein:
said counter counts iterations of judgment by said first judgment circuit to determine whether or not a tap gain renewal condition corresponding to iterations of ghost removal processing has been satisfied.

9. The apparatus of claim 2, wherein:
said second judgment circuit is a gate circuit having a counter which counts iterations of ghost removal processing.

10. The apparatus of claim 9, wherein:
said counter counts iterations of judgment corresponding to activation and deactivation of said judgment circuit and which is equal to iterations of said ghost removal processing.

11. The apparatus of claim 2, wherein:
said comparison circuit has a counter which counts iterations of ghost removal processing.

12. The apparatus of claim 11, wherein:
said counter counts iterations of comparison of said comparison circuit and which is equal to iterations of ghost removal processing.

* * * * *